F. B. Morse.
Carriage Fender.
N° 55,692. Patented Jun. 19, 1866.

Witnesses: Inventor,

UNITED STATES PATENT OFFICE.

F. B. MORSE, OF MILWAUKEE, WISCONSIN.

IMPROVEMENT IN RUB-IRONS FOR CARRIAGES.

Specification forming part of Letters Patent No. 55,692, dated June 19, 1866.

*To all whom it may concern:*

Be it known that I, F. B. MORSE, of the city and county of Milwaukee, and State of Wisconsin, have invented a new and useful Improvement in Rub-Irons for Carriages; and I do hereby declare that the following is a full, clear, and exact description of the same, reference being had to the accompanying drawings, forming part of this specification, in which—

Figure 1:
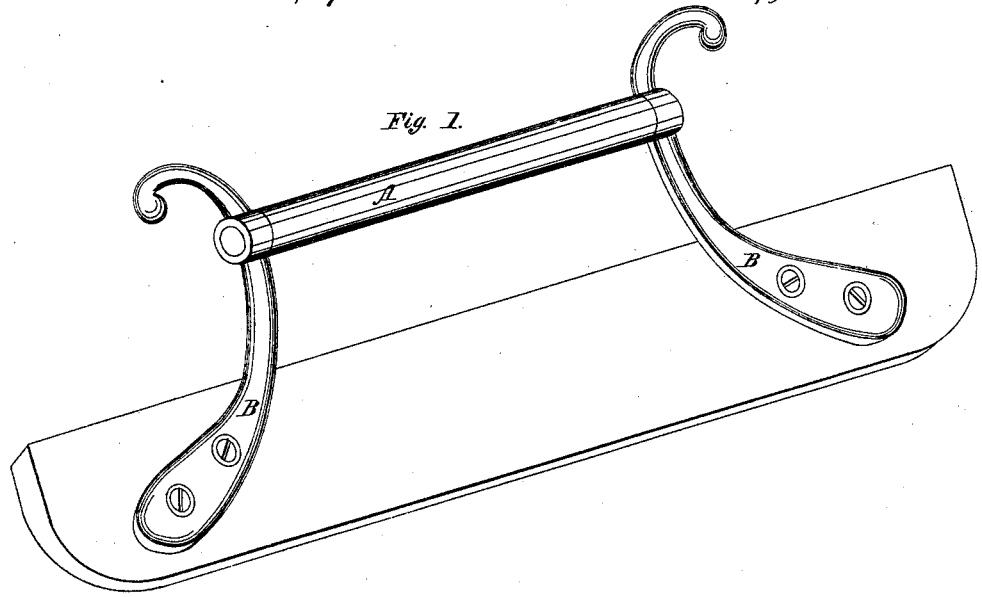
Figure 3:
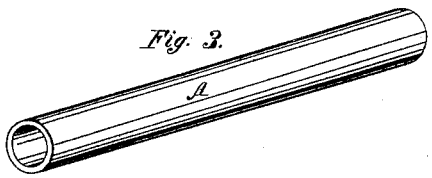
Figure 2:
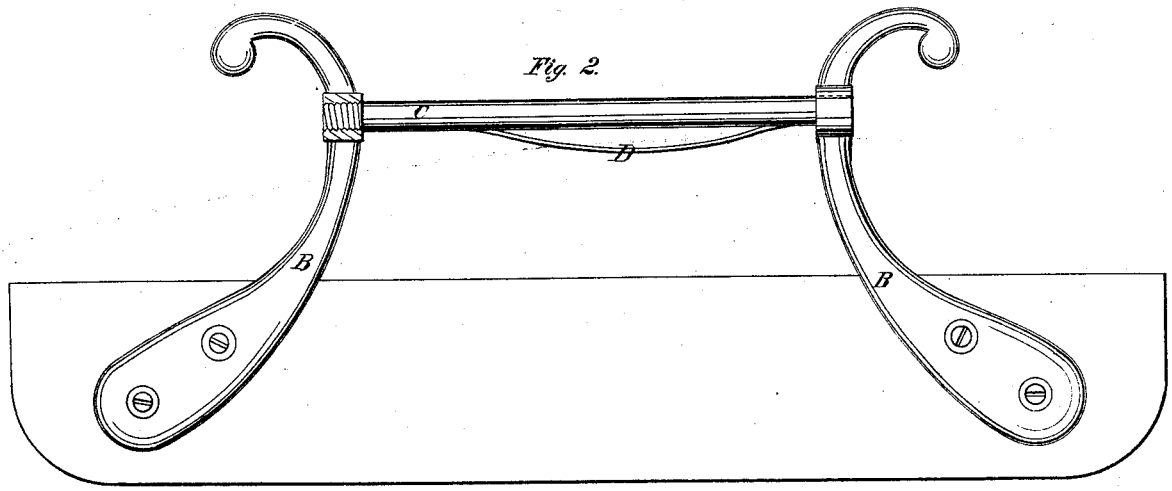

Figure 1 is a perspective view; Fig. 2, a view of the frame with the revolving rub-iron removed, and Fig. 3 the revolving rub-iron detached from the frame.

Similar letters of reference in each of the figures indicate corresponding parts.

The nature of my invention consists in a novel arrangement of mechanism by which a rub-iron is made to graduate with the weight in the carriage, revolving when the wheel comes in contact with it, and presenting different portions of its length to the tire of the wheel. The portion of the rub-iron with which the wheel of the carriage comes in contact I make round and hollow, of hardened steel, through which passes a bolt on which it revolves. To keep it from rattling I cut a groove from end to end of the shaft on which it revolves, in which I place a steel spring fastened to the shaft at one end, the other end being left loose. This spring is in the form of a bow, the two ends touching the shaft and the middle bowing out from it, so that when the revolving iron is slipped onto the shaft the spring is pressed down nearly straight, its back pressing against the inside of the revolving iron, which prevents it from rattling when the carriage is in motion.

To enable others skilled in the art to make and use my invention, I will proceed to describe its construction and operation.

A is the revolving iron; B B, bearers or supports attached to the carriage; C, shaft on which the rub-iron revolves; D, spring which keeps rub-iron A from rattling.

Operation: When the wheel strikes the rub-iron it revolves, and as the body of the carriage rises the wheel slips along the iron, making no impression on it, never catching and cramping, as with other rub-irons, and when the carriage is driven over any kind of pavement, no matter how jarring, the spring inside the roller keeps it from rattling.

What I claim as my invention, and wish to secure by Letters Patent, is—

Spring D, in combination with shaft C and revolving rub-iron A, substantially as and for the purpose described.

F. B. MORSE.

Witnesses:
J. B. SMITH,
CHAS. A. SMITH.